Aug. 22, 1961  H. H. KAY  2,997,022
ANIMAL FEEDER
Filed Aug. 11, 1958  2 Sheets-Sheet 1

Inventor:
Harry H. Kay
By Graf, Nierman & Burmeister
Attorneys

Aug. 22, 1961  H. H. KAY  2,997,022
ANIMAL FEEDER
Filed Aug. 11, 1958  2 Sheets-Sheet 2
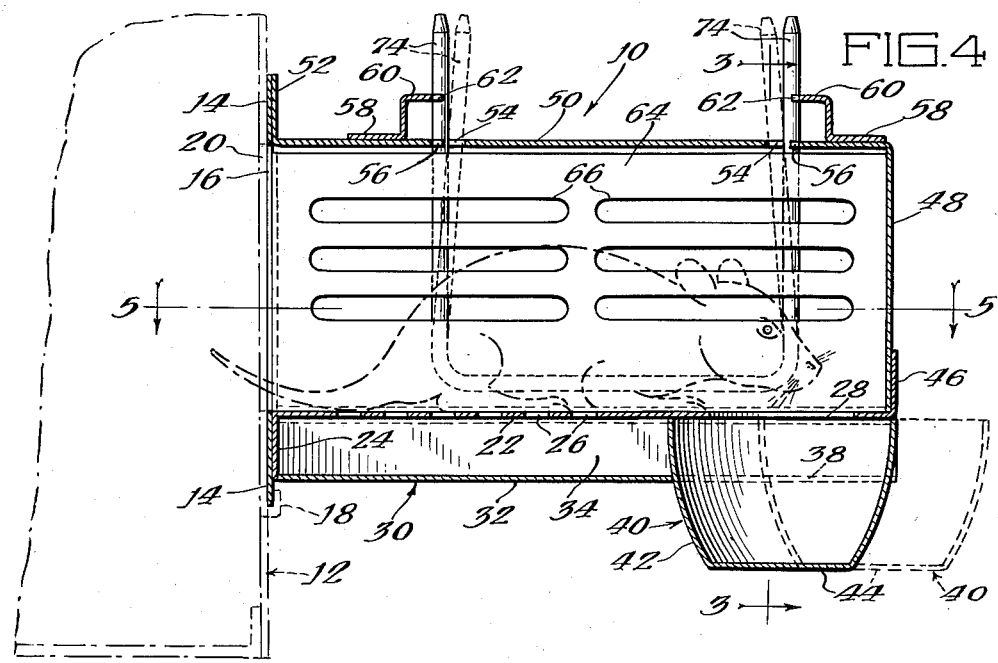
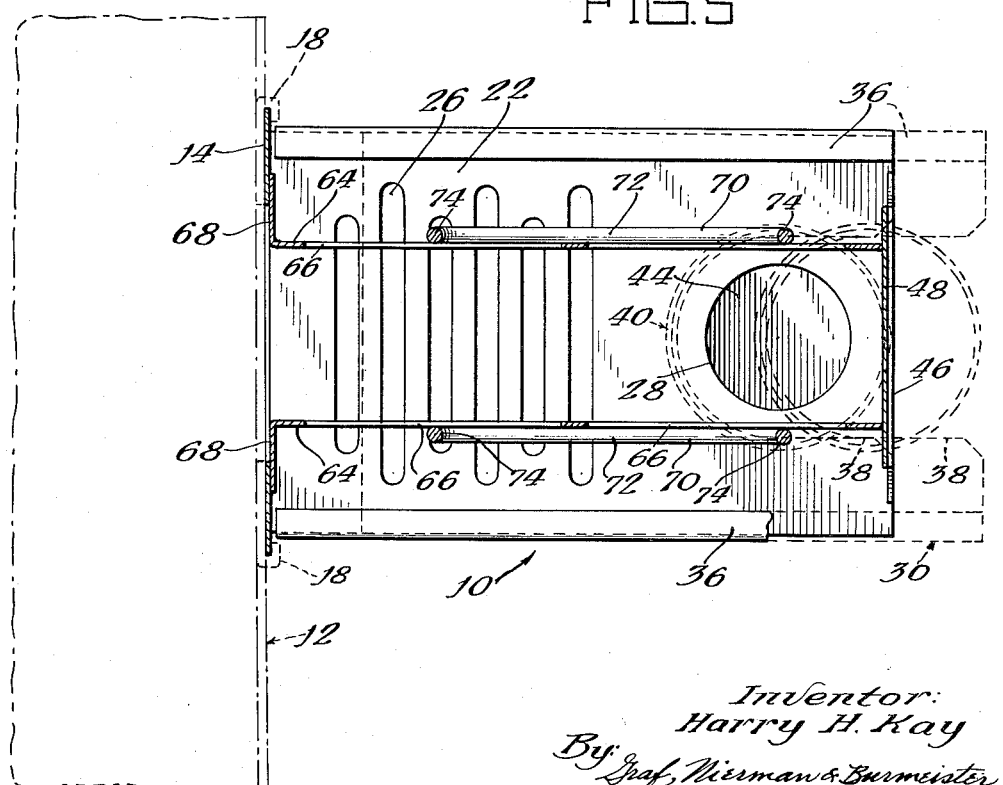
Inventor:
Harry H. Kay
By Graf, Nierman & Burmeister
Attorneys 2,997,022
ANIMAL FEEDER
Harry H. Kay, % Acme Metal Products,
7757 S. Chicago Ave., Chicago, Ill.
Filed Aug. 11, 1958, Ser. No. 754,295
6 Claims. (Cl. 119—61)

This invention relates to an improved animal feeder for use on animal cages especially adapted for holding animals used in scientific experiments.

In one common type of experiment, animals are subjected to metabolic tests wherein the animals' food consumption is closely observed and recorded, as are the animals' excreta.

In the performance of such experiments, it is common to make accurate measurements, as by weighing of the food given to the animals, the food remaining unconsumed, and the animal wastes. In order to maximize the accuracy of the measurements, and the meaningfulness of the data obtained, it is necessary to feed the animals in such a manner as to make these quantities separately measurable, i.e., to prevent dispersion of the uneaten food on the floor of the cage or other waste receptacle and to prevent the entry of animal waste materials into the food container. The latter is also important from the standpoint of preventing contamination of the food by waste materials which would discourage consumption of the food, and thus lead to erroneous inferences as to the appetite or feeding habits of the animals under observation. Such problems are particularly troublesome where the animals under experiment are of the rodent family, because of the notoriously untidy feeding habits of rodents. In the absence of special precaution, rodents are prone to spread feed materials over a large area, relatively remote from the food container, and are also prone to excrete without regard to the presence of the food container, thus seriously impairing the accuracy and meaningfulness of metabolic data.

It is the principal object of the present invention to provide a feeder for attachment to, or incorporation in, animal cages, particularly rodent cages, which maximizes the preservation of the separation between food and excreta. In accordance with the teachings of the invention, this is done in a highly effective, but nevertheless simple and inexpensive, manner.

The embodiment of the invention to be described is a feeder designed for attachment to a cage in registry with the feeder aperture which is commonly provided on laboratory cages for such purposes. The feeder consists in general of a rectangular box having an open inner end through which the animal enters the feeder from the cage, and a feed receptacle or container within the feeder. In the present feeder, the food receptacle is placed at the extreme outer end of the feeder, and the spacing between the side walls is made adjustable in a novel manner so that the animal cannot turn around within the feeder, but is obliged to back out of the feeder, the construction of the adjustable width provision being such as to permit convenient use of the same feeder with a variety of animal sizes. In addition, the feeder is so constructed as to minimize the possibility of food being scattered back into the cage. The assembly is designed to minimize the likelihood of removal of food other than that consumed from the food container, and food which may nevertheless be scattered on the floor of the feeder is deposited in a tray beneath the floor of the feeder, so that it cannot get back to the cage. The food container itself is secured to the feeder in a novel manner such that the food container is readily removable from the feeder either with or without the tray.

For understanding of the means by which the above objects are obtained, and for observation of the advantages of the invention other than those specifically discussed above, reference is made to the embodiment shown in the drawing, in which:

FIGURE 4 is a cross-sectional view taken on line 4—4 of FIGURE 1, the mobility of certain of the parts being shown by dotted indication; and FIGURE 5 is a cross-sectional view taken on line 5—5 of FIGURE 4, the mobility of certain of the parts being shown by dotted indication.

Figure 1:
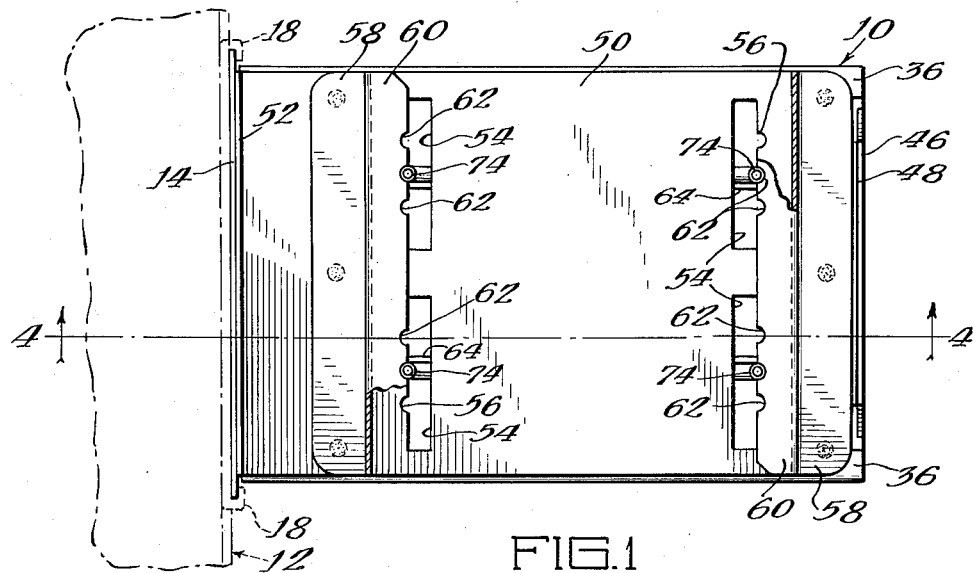
FIGURE 1 is a top view of an animal feeder embodying the present invention, with portions broken away in section, a portion of an animal cage upon which the feeder is mounted being shown in dotted form.

Referring now to the drawings, and more particularly FIGURES 1 and 4, it may be seen that the animal feeder, generally indicated by numeral 10, is removably attached to an animal cage which is shown in dotted form and generally indicated by numeral 12. The feeder 10 includes a faceplate 14 which has a substantially square aperture 16 in the center thereof. The faceplate 14 is slideably mounted on its edges in slides 18, which are shown in dotted form and constitute a part of the cage 12. Although slides 18 are shown for receiving the faceplate 14 and supporting the feeder 10, any one of a number of means obviously may be used to hold the animal feeder. As may be seen in FIGURES 4 and 5, the cage 12 has an opening 20, which registers with aperture 16 in faceplate 14 when the feeder is attached to the cage 12, so that an animal may enter the feeder.

The inner end of floor 22 of the feeder has a flange 24 formed integrally therewith. Flange 24 is spotwelded to the faceplate 14 below the aperture 16, so that the floor 22 is substantially perpendicular to the wall of the cage 12 and the floor is flush with the bottom of the aperture 16. The floor 22 has a plurality of transverse slots 26 in the portion adjacent the faceplate. These slots 26 provide a trap for feed spilled thereon, as will be hereinafter described. A circular food aperture 28 is formed in the outer portion of the floor 22.

A tray, generally indicated by numeral 30, is slideably attached to the floor 22 so that the tray 30 may be removed from the floor. The tray 30 has a bottom 32 which has a pair of opposed walls 34 formed integrally therewith. Each of the walls 34 has a channel 36 formed integrally with the upper portion thereof for engaging the edges of the floor 22. The channels 36 slideably engage the outer edges of the floor so that the tray may be slid out from the floor and removed entirely therefrom. The tray 30 is shown in dotted form in FIGURE 5 in a partially removed condition. It is evident that the tray may be removed entirely by further sliding it away from the faceplate. The tray bottom 32 has a container slot 38 formed therein, which slot is best seen in dotted form in FIGURE 5, the slot being semicircular at its inner end and extending to the outer edge of the floor.

Figure 3:
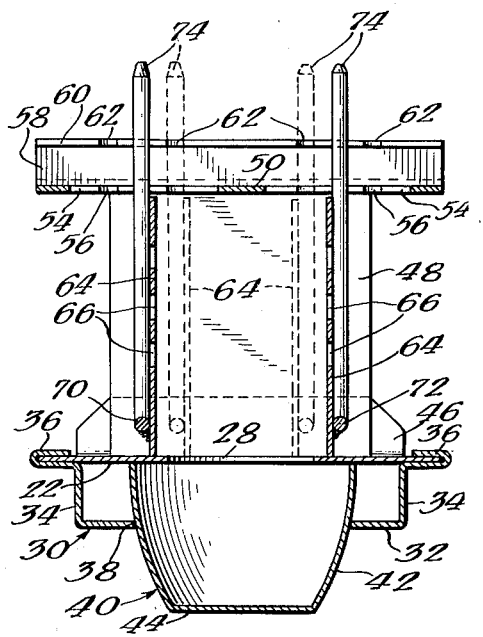
FIGURE 3 is a cross-sectional view taken on line 3—3 of FIGURE 4, and showing in dotted form an alternate position of certain of the parts.

A container or cup 40, which is best shown in FIGURES 3 and 4, is removably mounted in the container slot 38. The container 40 is circular, as may be seen in FIGURE 5, and has its walls 42 formed as a portion of a paraboloid, but its bottom 44 is substantially flat. It may be seen that the walls 42 thus have a curved taper, the portion of the walls above the point corresponding in diameter to the width of the slot 38 having a height equal to the spacing between the bottom of the tray and the floor of the feeder, so that when the container 40 is placed in slot 38, it is held snugly against the bottom of the floor 22. The slot 38 extends just past the aperture 28 when the tray 30 is in its innermost position. Thus, the aperture 28 is positioned in substantial registry with the container 40, thereby placing the container below the aperture. The diameter of aperture 28 is smaller than the diameter of the uppermost portion of container 40 so that the container always engages the bottom of the floor and feed is not easily spilled from the container onto the floor 22 by the scratching or digging action common to rodents.

The outer end of floor 22 has a flange 46 formed integrally therewith which flange 46 is substantially perpendicular to the floor. An outer end wall 48 is spotwelded to the flange 46. The end wall 48 is formed integrally with a top wall 50 which has a flange 52 integral therewith and spotwelded to the faceplate 14 above the aperture 16. The roof 50, which is coextensive with the floor, has four slots 54 formed therein. The slots 54 are formed in two pairs in which the slots in each pair are parallel to each other and each slot in each pair is collinear with the respective slot in the other pair. Four sets of notches 56 having three notches in each set are formed in the roof 50. Each set of notches 56 opens into a slot 54, and, as may be seen in FIGURE 1, the notches are formed in opposed edges of each of the slots of each pair.

Two brackets 58 are spotwelded to the roof 50. The brackets 58 each have a bar 60 which is spaced from the roof 50, as may be seen in FIGURE 4. The edge of each bar 60 registers with the outer edge of the respective slots 54, as is shown in FIGURE 1. Each of the bars 60 has formed therein two sets of notches 62 of three notches in a set, which sets of notches 62 register with notches 56.

Figure 2:
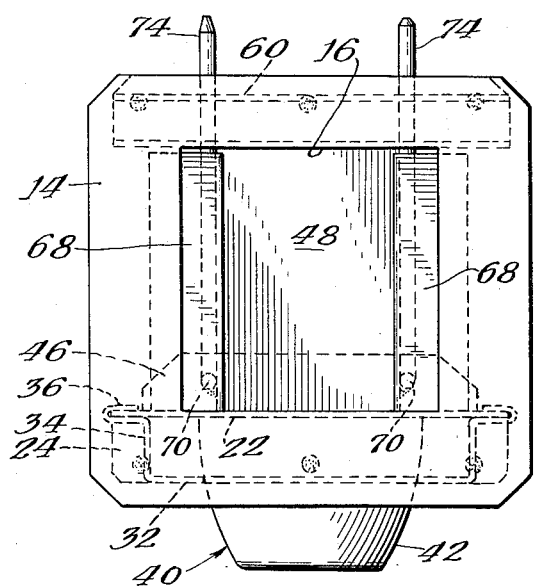
FIGURE 2 is an end view of the animal feeder shown in FIGURE 1.

A pair of opposed walls 64 are movably mounted on the roof 50. As may be seen in FIGURES 4 and 5, the walls 64 extend the entire length of the feeder and extend from the roof 50 to the floor 22. The walls each contain a plurality of vents 66 which allow air and light to enter the feeder. Each of the walls 64 has a sealing flange 68 formed integrally therewith and juxtaposed against the faceplate 14. As may be seen in FIGURE 2, the sealing flanges 68 extend outward beyond the aperture 16 when the walls are positioned in a selected position wherein the distance between the walls is less than the width of the aperture 16. By the aforementioned means, the aperture 16 is always restricted to an opening into the feeder only.

Each of the opposed walls 64 has a generally U-shaped latching member 70 attached thereto. Each of the members 70 has a crossmember 72, which is welded to the respective wall 64 and a pair of resilient arms 74 which are formed integrally with the crossmember and are free to move relative to the respective walls. As may be seen in FIGURE 4, the arms 74 extend through the slots 54 and are received in selected respective notches 56 and 62 to hold the walls in a selected position as will be hereinafter described.

In its usual operation, the feeder 10 is removably attached to the cage 12 and the opposed walls 64 are selectively positioned to provide a distance between said walls sufficient to accommodate an animal held in the cage. Each wall 64 is selectively positioned by pressing the respective arms 74 of the respective member 70 toward each other so that the resilient arms are removed from the notches 56 and 62 as is shown in dotted form in FIGURE 4. The wall then may be moved in a direction either toward or away from the other wall within the limits of the slots 54. The resilient arms are released adjacent a pair of selected notches so that the arms fall into the notches, thereby selectively positioning the wall. Either one or both of the walls may be moved to secure the desired distance between the walls.

The container 40 is removed from the tray 30 by sliding the container outward, as is shown in dotted form in FIGURE 4. The container is filled with a measured quantity of feed and is replaced by placing the container in the slot 38 and pushing it to the inner end of the slot so that the tapered walls 42 engage the tray and hold the top of the container against the bottom of the floor 22.

A rat or other animal held in the cage may enter the feeder through the aperture 16 and take its food from the container 40. The proximity of the walls 64 prevents the animal from turning around so that the animal must back out of the feeder, and should it drag any particles of feed with it, the particles fall through the slots 26 and are caught by the tray 30.

Since some food is caught on the tray 30, the tray must be cleaned periodically. The cleaning is accomplished by sliding the tray 30 with the container 40 outwardly from the faceplate 14. The food which falls to the tray may be then replaced in the container or it may be weighed and indicated on the records.

It will be obvious to those skilled in the art, after careful perusal of the above description and examination of the annexed drawing, that many changes may be made without departing from the teachings of the invention, which may be incorporated in structures substantially differing in appearance from that herein illustrated and described. Accordingly, the scope of the invention shall not be deemed to be limited by the particular embodiment shown in the drawing but shall be determined by the annexed claims.

What is claimed is:

1. An animal feeder for use on an animal cage comprising a faceplate adapted to be removably mounted on said animal cage, said faceplate having an animal entrance aperture in the central portion thereof, a floor fixed to said faceplate adjacent the aperture in said plate, said floor having a plurality of perforations adjacent the end fixed to said plate and an aperture adjacent the opposite edge of said floor, a tray removably attached beneath the floor, a food container removably mounted on said tray and positioned immediately below the aperture in said floor, a roof fixed at one edge to said faceplate above the aperture in said plate, said roof having two pairs of opposed transversely extending slots and a plurality of notches in said roof opening into said slots, a pair of brackets fixed to said roof, each of said brackets having a plurality of notches in one edge thereof registering with the notches in said roof, an outer end wall substantially parallel to the faceplate extending from said roof to said floor, a pair of opposed walls extending from the roof to the floor movably mounted between said roof and said floor, and a pair of resilient arms fixed to each of said walls, said arms engageable with said notches for selectively positioning said walls, whereby the walls may be selectively positioned to determine selectively the distance between said walls to permit access to the food while preventing deposition of animal waste in the food, and waste is deposited in the tray.

2. An animal feeder for use on an animal cage comprising a faceplate having an animal entrance aperture contained therein, a floor fixed to said faceplate below said aperture, said floor having a plurality of perforations adjacent the faceplate and an aperture adjacent the edge opposite said faceplate, a tray removably mounted beneath said floor substantially coextensive with said floor, a food container removably mounted on said tray and positioned below the aperture in the floor, a roof fixed to said faceplate above the aperture, an outer end wall extending from said roof to said floor, a pair of opposed walls substantially coextensive with the floor and extending from said roof to said floor, and means for selectively positioning each of said walls in a direction lateral to said roof and said floor whereby the distance between said opposed walls may be selectively varied to permit access to the food while preventing deposition of animal waste in the food, and waste is deposited in the tray.

3. An animal feeder assembly including a floor having an aperture proximate to one edge, a tray having a container slot open at one edge thereof, said tray mounted beneath said floor with the inner end of the slot beneath the aperture, and a container including walls having a height greater than the distance between the floor and the tray, said container removably mounted on said tray with its walls engaging the portion of the tray defining the slot and positioned below the aperture in the floor with the upper edge thereof in engagement with the floor, whereby the container may be removed by sliding it toward the open end of the slot.

4. An animal feeder assembly including a floor having an aperture proximate to one edge, a tray mounted beneath said floor, said tray having a container slot open at one edge thereof, and a container removably supported by said tray adjacent to the bottom of said floor beneath the aperture, said container having tapered walls having a width substantially equal to the distance between the floor and tray, whereby the container is held securely in place but may be removed by sliding it toward the open end of the slot.

5. An animal feeder assembly including a feed container having a bottom and walls attached to the bottom, a floor engaging the uppermost portion of the feed container, said floor having a feed aperture above said feed container proximate to one edge and a plurality of openings proximate to the opposite edge, and a tray for catching matter passed through said plurality of openings removably mounted beneath said floor and supporting the feed container, said tray having a container slot open at one edge receiving the feed container with the walls of said container engaging the portion of the tray defining the slot, whereby the container may be removed for refilling by sliding it out of the container slot or the tray and container may be removed together from beneath the floor for cleaning of the tray.

6. An animal feeder assembly including a floor having an aperture proximate to one edge and a plurality of openings proximate to the opposite edge, a tray slideably mounted beneath said floor to catch material passed through the openings, said tray having a container slot open at one edge, and a container positioned in said container slot below the aperture and supported by said tray, said container having tapered walls having a width substantially equal to the width of the slot at a distance from the top substantially equal to the distance from the floor to the tray, whereby the tray and container may be removed from the floor by sliding the tray and container substantially parallel to the floor, or the container may be separately removed with the tray in place.

References Cited in the file of this patent

UNITED STATES PATENTS

| | | |
|---|---|---|
| 706,316 | Hansell | Aug. 5, 1902 |
| 1,839,673 | Hartmann | Jan. 5, 1932 |
| 2,031,874 | Butler et al. | Feb. 25, 1936 |
| 2,165,968 | Hill | July 11, 1939 |
| 2,652,025 | Beatty | Sept. 15, 1953 |
| 2,660,981 | Jorenby | Dec. 1, 1953 |
| 2,661,800 | Reichenbach | Dec. 8, 1953 |
| 2,675,782 | Lage | Apr. 20, 1954 |
| 2,684,051 | Leblond et al. | July 20, 1954 |
| 2,698,004 | Luther | Dec. 28, 1954 |
| 2,714,367 | Arnold | Aug. 2, 1955 |
| 2,881,733 | Young et al. | Apr. 14, 1959 |